United States Patent [19]

Maheras et al.

[11] Patent Number: 5,446,140
[45] Date of Patent: Aug. 29, 1995

[54] POLYMER BLEND COMPOSED OF CELLULOSE ACETATE AND STARCH ACETATE AND STARCH USED TO FORM FIBERS, FILMS AND PLASTIC MATERIALS AND A PROCESS TO PREPARE SAID BLEND

[75] Inventors: Joanne C. Maheras, Charlotte; John B. Hopkins, Jr., Pineville; Heribert Tatzlaff, Charlotte, all of N.C.

[73] Assignee: Hoechst Celanese Corporation, Somerville, N.J.

[21] Appl. No.: 369,573

[22] Filed: Jan. 5, 1995

Related U.S. Application Data

[63] Continuation of Ser. No. 54,706, Apr. 28, 1993, abandoned.

[51] Int. Cl.$^6$ ............... C08B 31/02; C08B 33/02; C08B 35/02
[52] U.S. Cl. .................... 536/123; 536/55; 536/67; 536/107; 106/169; 106/196; 106/210
[58] Field of Search ............ 536/55, 69, 107, 123; 106/169, 196, 210

[56] References Cited

U.S. PATENT DOCUMENTS

| | | | |
|---|---|---|---|
| 2,092,677 | 9/1937 | Lovett | 106/210 |
| 2,137,170 | 11/1938 | Levey | 106/169 |
| 3,021,242 | 2/1962 | Touey . | |
| 3,329,509 | 7/1967 | Julius . | |
| 3,386,842 | 6/1968 | Hay . | |
| 3,607,348 | 9/1971 | Johnston et al. . | |
| 3,800,808 | 4/1974 | Hammersmith et al. . | |
| 4,026,718 | 5/1977 | Corville et al. . | |
| 4,497,847 | 2/1985 | Kurihara et al. . | |
| 4,533,562 | 8/1985 | Ikegami et al. . | |
| 4,627,850 | 12/1986 | Deiters et al. . | |
| 4,661,162 | 4/1987 | Kurihara . | |
| 4,681,583 | 7/1987 | Urquhart et al. . | |
| 4,705,515 | 11/1987 | Wong et al. . | |
| 4,715,143 | 12/1987 | Redenbaugh et al. . | |
| 4,853,229 | 8/1989 | Theeuwes et al. . | |
| 4,863,744 | 9/1989 | Urquhart et al. . | |
| 4,904,474 | 2/1990 | Theeuwes et al. . | |
| 5,205,863 | 4/1993 | Elion | 106/154.1 |

OTHER PUBLICATIONS

Grant & Hackh's Chemical Dictionary, McGraw-Hill Book Company, New York, 1987, p. 550.
Chemical Abstracts, vol. 96, No. 10 Austria Tabakwerke Aktiengesellschaft, p. 2, line 27–line 35.
Mullen et al., *Starch Studies,* Industrial Engineering Chemistry, vol. 35, No. 3, 1943, pp. 381–384.

*Primary Examiner*—Nathan M. Nutter
*Attorney, Agent, or Firm*—Philip P. McCann

[57] ABSTRACT

A blend of cellulose acetate and starch acetate used to make fibers, filaments, yarns, fabrics, plastic materials and other uses is disclosed. Additionally, the invention relates to the process of making said blend; cigarette filters made from tow composed of said blend; cigarettes made with filters made from tow of said blend as well as acetate flake and other compositions containing said blend.

4 Claims, No Drawings

POLYMER BLEND COMPOSED OF CELLULOSE ACETATE AND STARCH ACETATE AND STARCH USED TO FORM FIBERS, FILMS AND PLASTIC MATERIALS AND A PROCESS TO PREPARE SAID BLEND

This is a continuation of application Ser. No. 08/054,706 filed on Apr. 28, 1993, now abandoned.

FIELD OF THE INVENTION

This invention relates to a blend of cellulose acetate and starch acetate for fibers, filaments, yarns, plastic materials, and other uses. More particularly, this invention relates to a blend of 50 to 99% cellulose acetate with 1-50% starch acetate for the production of fibers, filaments, yarns, fabrics, plastic materials, and other uses. Additionally, this invention relates to the process of making said blend, cigarette filters made from tow made of said blend, cigarettes made with filters made from tow of said blend, filaments and fabrics containing said blend, acetate flake containing said blend and other compositions containing the blend.

BACKGROUND OF THE INVENTION

Both cellulose acetate and starch acetate have been known since the 19th century. However, a blend of these two common materials has not before been available due to processing problems.

Cellulose acetate of certain acetylation degrees is commonly used to manufacture cigarette tow, textile fibers, films, plastics and other materials. However, cellulose acetate as derived from wood pulp is expensive and requires the use of large amounts of acetone in processing resulting in high acetone recovery costs and possibly harmful acetone emissions. Starch acetate, depending on the degree of substitution (DS) of the free hydroxyl groups, may be used in a number of commercially important ways. Low DS acetates are important in food applications while highly derivatized starches with a DS of 2-3 are useful because of their solubility in organic solvents and ability to form films and fibers. Starch, to be used as a raw material for the preparation of starch acetate, is low cost and produces higher solids concentration in the acetylation process as compared with wood pulp acetylation.

A blend of cellulose acetate with starch acetate offers the possibility to combine a cheap raw material, starch, with the production of a fiber of the same or better quality and enhanced properties as compared with fibers made of cellulose acetate alone. The improved quality results from the molecular structure of starch as compared to wood pulp. Dry starch is generally a 25/75% mix of linear amylose and branched amylopectin polymer of α-D-glucopyranosyl units. Amylose has an average molecular weight of 17,000-225,000 with a degree of polymerization (DP) of about 100-1400. Amylopectin has an average molecular weight of 200,000—greater than 1,000,000. Dry wood pulp, the raw material used in the production of cellulose acetate, consists of 100% cellulose with an average molecular weight of 200,000—greater than 3,000,000 and a corresponding DP of 1200—greater than 20,000.

Despite the construction of the three polymers out of the same monomer, glucose, the branched structure of the amylopectin and the different conformations of the polymers is responsible for the enhanced properties of the blend versus either starch acetate or cellulose acetate individually. The lower molecular weight of amylose and amylopectin as compared with cellulose and the difference in molecular alignment, that is, in hydrogen bonding, results in less viscous acetone solutions of starch acetate which in turn allow an increased solids content in the spin dope. The spin dope is the cellulose acetate/starch acetate acetone solution. The increased solids content results in a spin dope of such a concentration to show liquid crystal behavior which generally results in higher strength fibers.

The advantages of a blend of starch acetate and cellulose acetate as noted above are evident, however, such blends in acetone have not previously been prepared because the acetone solution of the higher acetylated starch acetate (acetyl value (AV)=2.6-3) is immiscible with the standard cellulose acetate (AV=2.55) acetone solution.

It is known in the prior art to use blends of cellulose, acetate with other polymers to improve the properties of the blend. U.S. Pat. No. 2,059,425 discloses the production of textile materials and films using a blend of cellulose acetate with finely divided sugars such as, for example, glucose, sucrose or fructose, or their metallic compounds such as, for example, glucosates, fructosates, etc. of calcium, barium or strontium. The object of this patent is to deluster the produced plastic materials such as films or fibers by removal of the finely divided sugars by treating them with water or a solvent. The blend disclosed occurs only as an intermediate in the manufacturing process.

U.S. Pat. No. 3,272,638 discloses mixtures of cellulose acetate with sucrose and fatty acid esters or glucose fatty acid esters to make filaments such as filters tow. The fatty acids are acetic, propionic and isobutyric acid. One of the objects of this patent is to improve the spinning rate and curing process. The sucrose or esters are added to the acetone spin dope immediately before spinning.

U.S. Pat. No. 3,272,640 discloses a process for insolubilizing water-soluble materials such as cellulosics and starch derivatives corresponding to cellulosics by incorporating a "insolubilizing agent" with the water soluble material in a hydrophobic film firmer. The products obtained are claimed to be useful in the preparation of films and permanent fabric sizes with a high degree of water resistance. Both starch acetate and cellulose acetate are water insoluble materials.

U.S. Pat. No. 4,808,479 discloses a wrap yarn sizing composition that is comprised of a starch ether and/or ester having specific fluidity properties, however, the issue of a blend is not addressed in this patent.

Fibers spun out of a blend of starch acetate and cellulose acetate show significant improvements over fibers spun out of pure cellulose acetate. For instance, these fibers exhibit better dyeability, higher elongation due to the polymer structure, and improved moisture regain. Additionally, the use of a fiber spun out of a blend of starch acetate and cellulose acetate takes advantage of some physical properties imparted to the blend by the use of the starch acetate. For instance, there is a higher solids concentration in the spin dope which gives liquid crystalline behavior to the fiber resulting in higher tenacity.

The commercial significance of this invention lies not only in the desirability of an improved fiber but also in the environmental and economic aspects of this improved product. Cellulose acetate is typically produced through the acetylation and ripening of hardwood pulp in acetic acid with a sulphuric catalyst. Starch, a lower molecular weight raw material, can be similarly processed to make acetate. However, the cost of starch is approximately half that of wood pulp and the raw material is in much greater supply. Environmental aspects of this invention are related to lower acetic acid recovery costs and acetone recovery costs in the processing of starch acetate. The higher solids concentration in starch acetylation as compared to wood pulp acetylation results in lower acetic acid recovery costs, and accordingly, less emission of solvents in the extractions and distillation employed in recovery of the acetic acid. Additionally, higher solids concentration in the acetone spin dope reduces acetone recovery costs and acetone emissions.

The blend of the present invention is prepared by standard methods of preparing cellulose acetate.

DETAILED DESCRIPTION OF THE INVENTION

The present invention relates to a blend of cellulose acetate and starch acetate and other inventions derived from the novel blend, as well as, a process to prepare this blend.

In this application, the term "cellulose acetate" refers to any conventional wood pulp, cotton or any other suitable cellulose material being acetylated by organic acids to a degree of substitution ranging between 1.0 to 3.0 with an acetyl value of 20 to 62%.

The term "acetyl value" as used herein refers to the weight % of acetic acid per unit measure of starch acetate or cellulose acetate.

The term "starch acetate," as used herein refers to any conventional corn, potato, grain, or other suitable starch, containing amylose and amylopectin in any ratio deemed acceptable for our process and being acetylated by organic acids to a degree of substitution ranging between 1.0 to 3.0 with an acetyl value of 20–60%.

The term "blend", as used herein shall refer to combining, by use of a solvent, starch acetate with any cellulose esters with organic or inorganic acids and with mixtures of cellulose esters and other polymers.

The term "solvent" shall refer to acetone, methyl ethyl ketone, methylene chloride/methanol, glacial acetic acid or any suitable solvent which is capable of dissolving the forementioned cellulose esters, cellulose acetate, starch acetate or any combination thereof.

The present invention also provides a process for making spun yarn from said blend comprising the steps of preparing a mixture of cellulose acetate and starch acetate, solutioning the mixture in a suitable solvent, mixing, filtering, and then spinning the resultant blend in a spinning cabinet. Any type of spinning which is routinely used in the preparation of cellulose acetate is contemplated. These include dry spinning, wet spinning and melt spinning. An alternate method to prepare the blend is to co-precipitate a cellulose acetate and starch acetate reaction mixture in water in the proper ratio already in acetate manufacturing and then to follow routine cellulose acetate preparation steps including spinning. The dope temperature should be maintained at about 50° to 95° C. with a downdraft airflow temperature in the spinning cabinet held at about 50° to 100° C. to remove the solvent from the spun yarn by evaporation.

The preferred solvent in the process of the present invention is acetone.

Solvents suitable for the process of this invention are any nonaqueous solvents capable of creating an extrudable dope. Preferably, the solvent will be chosen such that it is capable of total solubility of cellulose acetate and starch acetate. Examples of such solvents include volatile, nonaqueous liquids such as low molecular weight aldehydes and ketones, hydrocarbons, and halogenated hydrocarbons, esters and ethers. Examples of solvent expressly capable of solubilizing cellulose esters are disclosed in U.S. Pat. No. 2,362,182, incorporated herein by reference. Those solvents include acetone, methyl ethyl ketone, methyl acetate, ethyl acetate, propyl acetate, nonaqueous methyl formate, ethyl formate, propyl formate and combinations thereof. Other suitable solvents include acetic acid, methylene chloride, methanol and combinations.

One major use of cellulose acetate is in flake to be made into cigarette tow for use in cigarette filters. Cellulose acetate is used because it does not impart any unwanted taste to the filters. Through sensory testing, it has been found that cigarettes made with filters of the cellulose acetate/starch acetate blend show no significant difference in taste to those made from cellulose acetate alone.

The following examples further illustrate various embodiments of the present invention. They are presented solely for illustrative purposes and are not to be construed as limiting the invention disclosed herein.

EXAMPLE 1

A mixture consisting of 7.5 lbs of cellulose acetate (CA) (AV=2.55) and 2.5 lbs. of starch acetate (SA) (AV>2.8) in 27.3 lbs acetone (26.8 % solids, 25% SA, 75% CA) was fed through a high shear mixer. The resultant stable solution was spun in a conventional CA spinning cabinet and compared to a control of pure CA (AV=2.55) dissolved in acetone (26.8% solids, 100% CA).

The yarn was produced with a feed roll speed of 500 m/mn and the dope temperature was kept at 85° C. The downdraft airflow in the spinning cabinet had a temperature of 75° C. to remove the acetone from the spun yarn by evaporation. The viscosity of the blend was less than 100,000 cps as compared to 150,000 to 180,000 for the control. Denier, tenacity and elongation were 179, 1.00 grm/denier and 25.27% in the blend as compared to 170, 1.14 grm/denier and 28.50% in the control. The blend showed improved dyeability.

EXAMPLE 2

A solution consisting of 7.5 lbs of CA (AV=2.55) and 2.5 lbs of SA (AV=2.59) in 18 lbs acetone (35.7% solids, 25% SA, 75% CA) was prepared according to the same process as in Example 1. The resultant solution was spun in a conventional CA spinning cabinet and compared to a control of pure CA (AV=2.55) dissolved in acetone (26.8% solids, 100% CA).

Metier conditions were consistent with those used in Example 1. The viscosity of the blend was 265,000 cps as compared to 150,000 to 180,000 for the control. Denier, tenacity and elongation were 175, 0.79 grm/denier and 28.36% in the blend as compared to 155, 1.22 grm/denier and 33.49% in the control.

Other examples were similarly run with the conditions and results as shown below in Table 1.

TABLE 1

THE EFFECT OF METIER CONDITIONS AND % STARCH ACETATE ON PHYSICAL PROPERTIES OF THE BLEND

| | % Starch Acetate | Dope Temp. °C. | JLAT. °C.* | Ten. grams/den | Elong. % | Ten. X Sqrt Elong |
|---|---|---|---|---|---|---|
| Control 1 | 0 | 85 | 70 | 1.14 | 28.50 | 6.09 |
| Control 2 | 0 | 85 | 70 | 1.22 | 33.49 | 7.06 |
| Control 3 | 0 | 85 | 70 | 1.20 | 32.47 | 6.84 |
| Trial 1A | 15 | 75 | 60 | 1.10 | 32.14 | 6.24 |
| Trial 1B | 20 | 75 | 60 | 1.03 | 30.77 | 5.71 |
| Trial 1C | 25 | 75 | 60 | 1.02 | 34.34 | 5.97 |
| Trial 2A | 15 | 85 | 60 | 1.09 | 34.96 | 6.44 |
| Trial 2B | 20 | 85 | 60 | 1.00 | 35.22 | 5.93 |
| Trial 2C | 25 | 85 | 60 | 1.00 | 36.68 | 6.05 |
| Trial 3A | 15 | 95 | 60 | 1.05 | 36.99 | 6.39 |
| Trial 3B | 20 | 95 | 60 | 1.01 | 35.43 | 6.01 |
| Trial 3C | 25 | 95 | 60 | 0.95 | 36.49 | 5.73 |
| Trial 4A | 15 | 95 | 70 | 1.04 | 36.86 | 6.31 |
| Trial 4B | 20 | 95 | 70 | 0.97 | 37.19 | 5.92 |
| Trial 4C | 25 | 95 | 70 | 0.96 | 37.22 | 5.85 |
| Trial 5A | 15 | 85 | 70 | 1.08 | 36.00 | 6.48 |
| Trial 5B | 20 | 85 | 70 | 1.00 | 35.45 | 5.95 |
| Trial 5C | 25 | 85 | 70 | 1.02 | 36.93 | 6.20 |
| Trial 6A | 15 | 75 | 70 | 1.10 | 34.58 | 6.47 |
| Trial 6B | 20 | 75 | 70 | 1.03 | 33.99 | 6.01 |
| Trial 6C | 25 | 75 | 70 | 1.00 | 34.98 | 5.91 |
| Trial 7A | 15 | 75 | 80 | 1.06 | 34.89 | 6.26 |
| Trial 7B | 20 | 75 | 80 | 1.00 | 37.13 | 6.09 |
| Trial 7C | 25 | 75 | 80 | 0.85 | 34.48 | 4.99 |
| Trial 8A | 15 | 85 | 80 | 1.08 | 37.02 | 6.57 |
| Trial 8B | 20 | 85 | 80 | 1.00 | 37.02 | 6.08 |
| Trial 8C | 25 | 85 | 80 | 0.94 | 34.94 | 5.56 |
| Trial 9A | 15 | 95 | 80 | 1.06 | 37.45 | 6.49 |
| Trial 9B | 20 | 95 | 80 | 0.98 | 37.42 | 5.99 |
| Trial 9C | 25 | 95 | 80 | 0.91 | 36.85 | 5.52 |

*Jet Level Air T°C.

We claim:

1. A blended alloy capable of being used for the production of film, fiber, fibrets, filaments, moldings, and plastic materials or a combination of these comprising cellulose acetate having a degree of substitution between 2.0 and 3.0; and
starch acetate having a degree of substitution between 2.55 and 3 having about 25% of linear amylose and about 75% branched amylopectin.

2. A fiber comprising of a blended alloy comprising cellulose acetate have a degree of substitution between 2.0 and 3.0; and starch acetate having a degree of substitution between 2.55 and 3.

3. A filament comprising of blended alloy comprising cellulose acetate having a degree of substitution between 2.0 and 3.0; and starch acetate having a degree of substitution between 2.55 and 3.

4. A fibret comprising of blended allow comprising cellulose acetate having a degree of substitution between 2.0 and 3.0; and starch acetate having a degree of substitution between 2.55 and 3.

* * * * *